United States Patent [19]

Braüers et al.

[11] Patent Number: 4,462,602
[45] Date of Patent: Jul. 31, 1984

[54] PISTON RING WITH ANNULAR EXPANDER SPRING

[75] Inventors: Bert Braüers, Blecher-Odenthal; Reiner Kierst, Bergisch-Gladbach; Martin Morsbach, Burscheid, all of Fed. Rep. of Germany

[73] Assignee: Goetze AG, Burscheid, Fed. Rep. of Germany

[21] Appl. No.: 473,627

[22] Filed: Mar. 9, 1983

[30] Foreign Application Priority Data

Mar. 9, 1982 [DE] Fed. Rep. of Germany ....... 3208396

[51] Int. Cl.³ .......................... F01C 19/08; F16J 9/06
[52] U.S. Cl. ..................... 277/139; 277/141; 277/142; 267/1.5
[58] Field of Search .................. 277/138–142, 277/154, 188 R, 216, 143; 267/1.5

[56] References Cited

U.S. PATENT DOCUMENTS

| | | |
|---|---|---|
| 2,621,989 | 12/1952 | Norton . |
| 3,477,732 | 11/1969 | Warrick . |
| 3,627,333 | 12/1971 | Hill . |
| 3,738,668 | 6/1973 | Minegishi ................ 267/1.5 X |
| 4,183,544 | 1/1980 | Morsbach et al. . |

FOREIGN PATENT DOCUMENTS

| | | |
|---|---|---|
| 921491 | 12/1954 | Fed. Rep. of Germany . |
| 1087855 | 8/1960 | Fed. Rep. of Germany ...... 277/139 |
| 1096132 | 12/1960 | Fed. Rep. of Germany ...... 277/140 |
| 1101070 | 3/1961 | Fed. Rep. of Germany . |
| 1232419 | 1/1967 | Fed. Rep. of Germany ...... 277/139 |
| 1273935 | 7/1968 | Fed. Rep. of Germany . |
| 1297423 | 12/1969 | Fed. Rep. of Germany . |
| 1958128 | 2/1972 | Fed. Rep. of Germany . |
| 1952890 | 9/1972 | Fed. Rep. of Germany . |
| 2720297 | 10/1978 | Fed. Rep. of Germany . |

*Primary Examiner*—Robert S. Ward
*Attorney, Agent, or Firm*—Spencer & Frank

[57] ABSTRACT

A piston ring assembly has a ring-shaped expander spring composed of an annular body defining an axial direction and presenting a circumferential main bending region and a plurality of resilient tongues extending radially outwardly from the main bending region and adjoined, adjacent the main bending region, by generally axially extending parts of the annular body. The assembly further has a lamina lying, at least in part, on the tongues and is radially supported by the axially extending parts. The main bending region is disposed radially inwardly of the lamina.

11 Claims, 11 Drawing Figures

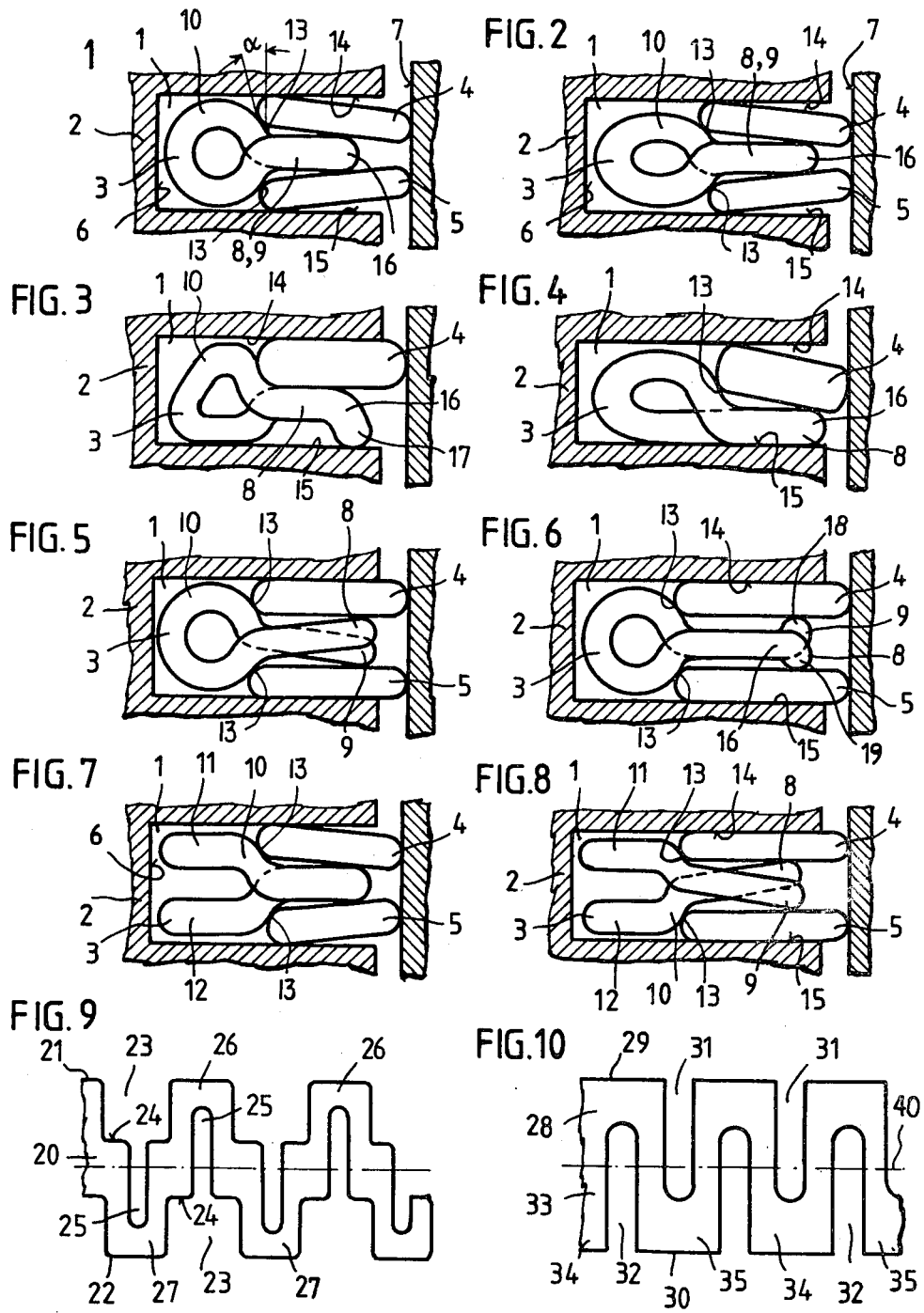

PISTON RING WITH ANNULAR EXPANDER SPRING

BACKGROUND OF THE INVENTION

The present invention relates to a piston ring, and particularly to an oil scraping ring of axially low structural height which is composed of an expander spring, made of a band-type or wire material, and at least one lamina resting, at least in part, on a plurality of radially extending resilient tongues of the expander spring and being supported radially by legs of the resilient tongues which are bent in an approximately axial orientation.

German Pat. No. 1,087,855 discloses a tangentially, axially and radially resilient wire clamping spring for an oil scraping ring in which the spring coacts with two laminae. To radially and axially clamp the individual laminae, separate inherently resilient turn portions of the expander spring are arranged such that adjacent turn portions alternately rest against one or the other lamina. The major portion of the expander spring, and consequently also its bending region, is disposed axially between the two laminae so that a relatively large axial structure results which does not meet requirements of present-day oil scraping rings. Moreover, it is relatively difficult, and thus quite expensive, to produce such wound expander springs.

Another expander spring for a piston ring is disclosed in U.S. Pat. No. 3,627,333. The spring employed is made of a band-type material and, when seen in the circumferential direction, is provided with alternating slots emanating from both inner and outer circumferential edge faces. In the region of the outer circumferential edge face of the expander spring there are provided alternating, approximately axially bent legs which each serve to radially support one lamina. The resilient, radially extending tongues here serve as support faces for the two laminae. In this spring, the bending region is comprised merely of the bent legs while the actual spring region is disposed exclusively between the two laminae. Very short lever arms are realized with this structural design of the spring, which results in a hard spring characteristic. In operation, there is a continuous relative movement between spring and lamina. The resulting wear between spring and lamina leads to a greater drop in tangential force in the case of a hard spring characteristic than with a softer spring characteristic.

SUMMARY OF THE INVENTION

It is an object of the present invention to provide an improved piston ring which includes an expander spring and at least one lamina and which has an extremely low axial structural height and further, the expander spring has a soft spring characteristic. At the same time, the lamina is to have a small radial wall thickness so that the system can fill voids as fully as possible.

These objects and others to become apparent as the specification progresses, are accomplished by the present invention in that the main bending region of the expander spring, when seen in the circumferential direction, is arranged essentially radially inwardly of the lamina.

By placing the bending region to a position essentially radially inwardly of the lamina, in addition to a reduction of the axial height of the spring in a simple manner, a spring characteristic is realized which permits it to be adapted to any desired use.

In addition to expander springs made of band-like material, the present invention can also be used for expander springs made of wound wire. In contrast to springs cut out of band-like material, expanders made of wire material generally have several bending regions due to their turns. However, according to the present invention, the main bending region is disposed radially inwardly of the lamina so as to be able to influence the spring characteristic even for expander springs made of wound wire in a manner which is advantageous for the piston ring.

A number of embodiments are possible for the structural design of the bending region in expander springs made of band-like material as well as wire. In one such embodiment the main bending region includes either a bent, wound, approximately angular, circular or oval cross-sectional profile. In a further embodiment the main bending region comprises a plurality of flaps which emanate from the bent tongues and extend radially in a direction opposite to the lamina toward the bottom of the groove in the piston without, however, touching the bottom of the groove. Whether one or the other preferred embodiment is used, depends on the particular case at hand. The radial depth and the axial height of the piston groove or the desired spring characteristic of the expander spring, play, among others, an important part in the structural design of the piston ring according to the invention.

To attain good axial contact pressure for the lamina, at least part of the resilient tongues is axially bent in the region of their free ends and supported at the corresponding groove wall.

In a piston ring, particularly an oil scraper ring, comprising at least two laminae and at least one expander spring whose radially directed resilient tongues are each disposed between the two laminae, a further feature of the invention provides that the resilient tongues, as viewed in the circumferential direction, emanate from the main bending region and extend alternatingly in the direction toward the two laminae, exerting axial pressure on them.

In another aspect of the invention at least part of the resilient tongues, in the region of their free ends, is axially bent in the direction toward the respective lamina. In addition to radial elasticity, this provides further axial elasticity for the expander spring.

It is a further feature of the invention that the angle formed between the resilient tongues and the main bending region of the expander spring in the transition region of the latter lies between 10° and 30°. This results in the further advantage that the lamina or laminae, in operation, can travel up the thus formed slope while naturally placing themselves in an oblique orientation due to the torque initiated at the point of contact. Thus, during operation, these conditions prevail: The lamina or laminae are in linear contact with the expander spring at the slope of the transition region as well as in the region of the free ends of the resilient tongues. The forcible oblique positioning (twisting) of the lamina or laminae causes them also to rest linearly against the respective groove wall thus producing a very good seal. Such piston rings can also be used as compression piston rings, even in extreme situations.

BRIEF DESCRIPTION OF THE DRAWINGS

FIGS. 1 through 8 are cross-sectional views in an axial plane of eight preferred embodiments of a piston ring according to the invention.

FIG. 9 is a top plan view of a cut (stamped out) blank used for making a component of the embodiments shown in FIGS. 1–6.

FIG. 10 is a top plan view of a cut (stamped out) blank for making a component in the embodiments shown in FIGS. 7–8.

DETAILED DESCRIPTION OF THE PREFERRED EMBODIMENTS

Figure 1A:
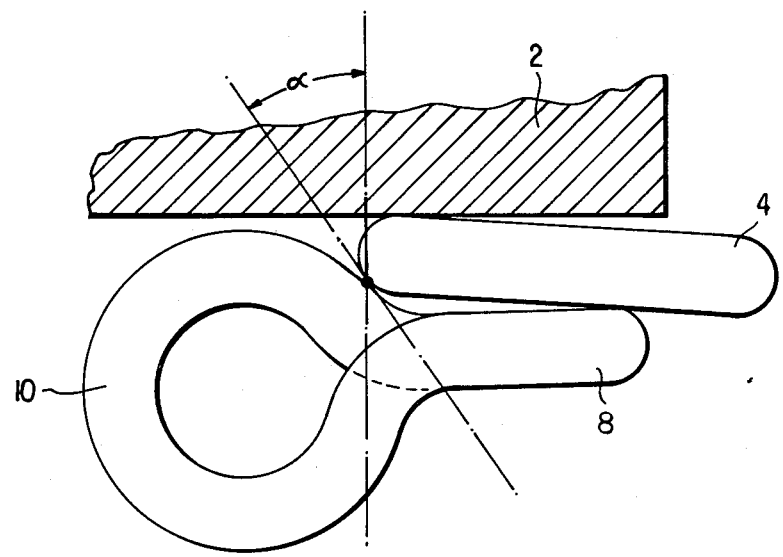
FIG. 1a shows an enlarged section of FIG. 1.

The piston rings shown in FIGS. 1 through 8 are each inserted into a groove 1 of a piston 2. Groove 1 has a bottom wall 6 and side walls 14 and 15. The piston rings each comprise an expander spring 3 made of a band-like material and either one lamina 4, as shown in FIGS. 3 and 4, or two laminae 4 and 5, as shown in FIGS. 1, 2 and 5–8. In each case each lamina is pressed against the corresponding cylinder wall 7 by expander spring 3 which is unsupported at bottom 6 of groove 1.

The expander spring 3 is an annular body having an axial direction which is parallel to the axis of piston 2; that is, the axial direction is parallel to the cylinder wall 7 and the plane of drawing FIGS. 1–8. The annular body also has a radial direction which is perpendicular to the cylinder wall 7. The expander spring 3 has a circumferential main bending region 10 from which extend, generally radially, resilient tongues 8 and 9, each having an end region 16. The tongues 8 and 9 form contact faces for lamina 4 or laminae 4 and 5, respectively. In order to provide a soft spring characteristic for expander spring 3, the main bending region 10 is disposed essentially radially inwardly of lamina 4 or laminae 4 and 5. As shown in FIGS. 1–8, main bending region 10 can have various cross-sectional profiles. It may be approximately circular (FIGS. 1, 5 and 6), oval (FIGS. 2 and 4), generally trapezoidal (FIG. 3), or it can have U-shaped tabs 11, 12 (FIGS. 7 and 8). The resilient tongues 8 or 8 and 9 merge into the main bending region 10 with the intermediary of a transition region 13 which forms a radial supporting face for lamina 4, or laminae 4 and 5, respectively. The angle α formed in the transition region is about 15°.

The angle α is formed between the tangent drawn to the point where the bending region 10 has contact with the radial inner surface of the lamina 4, or the laminae 4 and 5, respectively, and a line running, parallel to the axis (not shown) of the ring system. The transition region between the main bending portion 10 and the resilient tongues 8 together with an indication of the angle α is shown in FIG. 1a in an enlarged manner.

In operation of the embodiments shown in FIGS. 1 and 2, each lamina 4, 5, as it travels up the slope of the transition region 13, is supported by a three-line contact, namely at transition region 13, at corresponding groove wall 14 and 15 and at end region 16 of the tongues 8 and 9.

In the piston ring according to FIG. 3, the expander spring 3 is, in end region 16 of each tongue 8, approximately axially bent to form fingers 17 extending toward the corresponding groove wall 15 and is there axially supported. In this configuration, tongue 8 exerts an axial force on lamina 4 which thus rests with its entire surface area against corresponding groove wall 14.

Expander spring 3 according to FIG. 4 also has only one lamina 4. Each resilient tongue 8 rests with its entire surface area against groove wall 15, while lamina 4 rests with a three-line contact against transition region 13, groove wall 14, and end region 16, as described in connection with FIGS. 1 and 2.

FIG. 5 shows an expander spring 3 equipped with axially resilient tongues 8 and 9 which extend from main bending region 10 and which, when viewed in the circumferential direction of expander spring 3, alternatingly exert an axial pressure on the two laminae 4 and 5. With this axial pressure, laminae 4 and 5 are each pressed, with their entire surface areas against corresponding groove walls 14 and 15.

FIG. 6 is similar to FIG. 5 in that laminae 4 and 5 are each pressed with their entire surface areas against the respective groove walls 14 and 15. Each end region 16 of resilient tongues 8 and 9 is alternatingly bent to form fingers 18 and 19, respectively, which each extend approximately axially toward respective lamina 4 and 5 and exert an axial force in a region of contact therewith.

FIG. 7 shows an expander spring 3 in which the main bending region 10 has a U-shaped configuration formed by radial arms or tabs 11 and 12 which extend into the immediate vicinity of bottom 6 of groove 1 without, however, touching it. Here again, laminae 4 and 5 each have a three-line contact as described in connection with FIGS. 1, 2 and 4.

Expander spring 3 according to FIG. 8 is similar to the spring shown in FIG. 7 with the difference that resilient tongues 8 and 9 are bent to incline in the axial direction starting from the main bending region 10, with the result that laminae 4 and 5 are pressed with their entire surface areas against respective groove walls 14 and 15, as discussed in connection with FIG. 5.

FIGS. 9 and 10 show stamped-out blanks with different patterns which can be used to form the expander springs discussed above. FIG. 9 illustrates a blank 20 that is suitable for producing expander springs 3 according to FIGS. 1 to 6, whereas FIG. 10 illustrates a blank 28 that is suitable for the production of expander springs 3 shown in FIGS. 7 and 8.

The blank 20 shown in FIG. 9 is made of a metal band, having approximately rectangular pieces 23 cut alternately out of one edge 21 and an opposite edge 22 to form end regions 24 and tongues 26 and 27. A slit 25 is formed in each end region 24 in the direction toward respectively corresponding edges 21 and 22. The further the slits 25 extend in the direction toward the respectively corresponding edges 21 and 22, the softer the spring characteristic or expander spring 3 becomes. The limit of softness depends on the respective materials and dimensions employed, that is, their thickness, width and substance. An expander spring 3 according to FIGS. 1–6 is formed from band 20 by bending tongues 26 and 27 into recesses 23 to thus form resilient tongues 8 and 9. Tongues 8 and 9, depending on the manner they were bent, either remain in one plane as shown in FIGS. 1, 2 and 4, or exert an axial force on the respective laminae 4 and 5 as shown in FIGS. 3, 4 and 6.

The blank 28 of FIG. 10 is also made from a metal band. Starting at its edges 29 and 30, approximately U-shaped notches 31 and 32 extend alternatingly in the direction toward corresponding edges 29 and 30. The same conditions as stated in connection with FIG. 9 apply for the dimensions of the notches. In a lower region 33 below a center line 40, notches 32 define tongues 34 and 35. To form the U-shaped profile of main bending region 10 shown in FIGS. 7 and 8, tongues 34 and 35 are alternatingly bent at center line 40 in and out of the plane of the blank 28 to produce radial arms or tabs 11 and 12 which are alternatingly angled toward the top and bottom of groove 1 in FIGS. 7 and 8.

It will be understood that the above description of the present invention is susceptible to various modifications, changes and adaptations and the same are intended to be comprehended within the meaning and range of equivalents of the appended claims.

What is claimed is:

1. A piston ring assembly comprising:
    a ring-shaped expander spring composed of an annular body defining an axial direction and presenting a circumferential main bending region and a plurality of resilient tongues extending radially outwardly from said main bending region and adjoined, adjacent said main bending region, by generally axially extending parts of said annular body and
    a lamina lying, at least in part, on said tongues and being radially supported by the axially extending parts, said main bending region being disposed radially inwardly of said lamina.

2. An assembly as defined in claim 1, wherein said tongues are inclined towards said axial direction.

3. An assembly as defined in claim 1, wherein said main bending region has an approximately circular cross-sectional profile.

4. An assembly as defined in claim 1, in combination with a piston having a circumferential piston groove provided with a bottom, wherein said assembly is disposed in said piston groove, and said lamina is present in a plurality; one lamina being disposed on each side of said tongues as viewed in said axial direction and supported, at least in part, by said tongues; and said main bending region being formed of a plurality of flaps extending from said tongues radially away from a respective lamina in the direction toward the bottom of the piston groove.

5. An assembly as defined in claim 4, wherein said flaps extend to the immediate vicinity of said bottom and terminate spaced therefrom.

6. An assembly as defined in claim 1, wherein said tongues each have a free end and each said resilient tongue is bent in the axial direction at least in the region of said free end.

7. An assembly as defined in claim 1, wherein said lamina is present in a plurality and further wherein said tongues are each disposed between two laminae and are inclined from said bending region alternatingly towards opposite axial directions for exerting a pressure on the two laminae in a direction parallel to said axial direction.

8. An assembly as defined in claim 7, wherein said tongues each have a free end and each said resilient tongue is bent alternatingly in opposite axial directions toward the corresponding lamina at least in the region of said free end.

9. An assembly as defined in claim 1, wherein said annular body includes a transition zone between the main bending region and each tongue; said transition zone comprising said axially extending parts; and an angle being formed between said tongues and said bending region in said transition zone; said angle being between 10° and 30°.

10. An assembly as defined in claim 9, in combination with a piston having a circumferential piston groove comprising opposite side walls, wherein said assembly is disposed in said piston groove, and said tongues each have a free end; said lamina, in operation, engaging with linear contact said main bending region, a corresponding one of said groove walls and a region of the free ends of the resilient tongues.

11. An assembly as defined in claim 1, wherein said main bending region has an approximately oval cross-sectional profile.

* * * * *